United States Patent
Simhadri et al.

(10) Patent No.: US 12,282,516 B2
(45) Date of Patent: Apr. 22, 2025

(54) FACETED NAVIGATION

(71) Applicant: Home Depot Product Authority, LLC, Atlanta, GA (US)

(72) Inventors: Venkata Goutham Simhadri, Atlanta, GA (US); Janani Balaji, Cumming, GA (US); Jeyaprakash Singarayar, Smyrna, GA (US); Olga Stolpovskaia, Marietta, GA (US); Suhail Shaikh, Atlanta, GA (US)

(73) Assignee: Home Depot Product Authority, LLC, Atlanta, GA (US)

( * ) Notice: Subject to any disclaimer, the term of this patent is extended or adjusted under 35 U.S.C. 154(b) by 237 days.

(21) Appl. No.: 17/738,332

(22) Filed: May 6, 2022

(65) Prior Publication Data

US 2022/0358172 A1 Nov. 10, 2022

Related U.S. Application Data

(60) Provisional application No. 63/193,582, filed on May 26, 2021, provisional application No. 63/185,665, filed on May 7, 2021.

(51) Int. Cl.
*G06F 16/9532* (2019.01)
*G06F 16/957* (2019.01)
*G06F 40/40* (2020.01)

(52) U.S. Cl.
CPC ...... *G06F 16/9532* (2019.01); *G06F 16/9574* (2019.01); *G06F 40/40* (2020.01)

(58) Field of Classification Search
CPC .. G06F 16/9532; G06F 16/9574; G06F 40/40; G06F 16/3322; G06F 40/237; G06F 40/284
See application file for complete search history.

(56) References Cited

U.S. PATENT DOCUMENTS

| | | | |
|---|---|---|---|
| 8,688,673 B2* | 4/2014 | Sarkar | G06F 16/35 707/726 |
| 9,092,802 B1* | 7/2015 | Akella | G06F 16/36 |
| 10,909,075 B2 | 2/2021 | Sharp et al. | |
| 2010/0114654 A1* | 5/2010 | Lukose | G06Q 30/00 705/14.54 |
| 2014/0081941 A1 | 3/2014 | Bai et al. | |
| 2016/0300287 A1* | 10/2016 | Johnson | G06F 16/951 |
| 2017/0017721 A1* | 1/2017 | Sauper | G06F 16/248 |
| 2019/0179810 A1* | 6/2019 | Miller | G06F 16/2477 |

(Continued)

OTHER PUBLICATIONS

ISA/US, Int'l Search Report and Written Opinion issued in PCT/US22/28258, dated Sep. 12, 2022, 13 pgs.

(Continued)

*Primary Examiner* — Abul K Azad
(74) *Attorney, Agent, or Firm* — Greenberg Traurig, LLP

(57) ABSTRACT

A method includes extracting a set of candidate keywords from clickstream data and natural language processing of product text for a plurality of search queries. The set of candidate keywords are filtered based on the clickstream data. The set of candidate keywords as filtered are ranked based on the clickstream data. The set of candidate keywords as ranked are clustered to remove near duplicates. The set of candidate keywords as ranked for a respective search query is output.

20 Claims, 4 Drawing Sheets

(56) References Cited

U.S. PATENT DOCUMENTS

2021/0133271 A1* 5/2021 Williams ............ G06F 16/9566
2022/0284234 A1* 9/2022 Hoffman .............. G06V 30/414

OTHER PUBLICATIONS

Anchahua et al., "User experience maturity model for ecommerce websites," in 2018 Congreso Internacional de Innovacion y Tendencias en Ingenieria (CONIITI), 2018, pp. 1-6.

Boudin, "pke: an open source python-based keyphrase extraction toolkit," in Proceedings of COLING 2016, the 26th International Conference on Computational Linguistics: System Demonstrations, Osaka, Japan, Dec. 2016, pp. 69-73.

Devlin et al., "BERT: pre-training of deep bidirectional transformers for language understanding," CoRR, vol. abs/1810.04805, 2018.

Guo et al., "Debiasing grid-based product search in e-commerce," in Proceedings of the 26th ACM SIGKDD International Conference on Knowledge Discovery Data Mining, ser. KDD '20. New York, NY, USA: Association for Computing Machinery, 2020, p. 2852-2860.

Karat et al., "Designing personalized user experiences for ecommerce: Theory, methods, and research," in CHI '03 Extended Abstracts on Human Factors in Computing Systems, ser. CHI EA '03. New York, NY, USA: Association for Computing Machinery, 2003, p. 1040-1041.

Koren et al., "Personalized interactive faceted search," in Proceedings of the 17th International Conference on World Wide Web, ser. WWW '08. New York, NY, USA: Association for Computing Machinery, 2008, p. 477-486.

Liu et al., "Numerical facet range partition: Evaluation metric and methods," in Proceedings of the 26th International Conference on World Wide Web Companion, ser. WWW '17 Companion. Republic and Canton of Geneva, CHE: International World Wide Web Conferences Steering Committee, 2017, p. 662-671.

Liu et al., "Unsupervised approaches for automatic keyword extraction using meeting transcripts," in Proceedings of Human Language Technologies: The 2009 Annual Conference of the North American Chapter of the Association for Computational Linguistics, ser. NAACL '09. USA: Association for Computational Linguistics, 2009, p. 620-628.

Mihalcea et al., "TextRank: Bringing order into text," in Proceedings of the 2004 Conference on Empirical Methods in Natural Language Processing. Barcelona, Spain: Association for Computational Linguistics, Jul. 2004, pp. 404-411.

Mikolov et al., "Efficient estimation of word representations in vector space," 2013, 12 pp.

Qingyun et al., "Keyword extraction method for complex nodes based on textrank algorithm," in 2020 International Conference on Computer Engineering and Application (ICCEA), 2020, pp. 359-363.

Sondhi et al., "A taxonomy of queries for e-commerce search," in The 41st International ACM SIGIR Conference on Research Development in Information Retrieval, ser. SIGIR '18. New York, NY, USA: Association for Computing Machinery, 2018, p. 1245-1248.

Vandic et al., "Dynamic facet ordering for faceted product search engines," IEEE Trans. on Knowl. and Data Eng., vol. 29, No. 5, p. 1004-1016, May 2017.

Vandic et al., "Facet selection algorithms for web product search," in Proceedings of the 22nd ACM International Conference on Information Knowledge Management, ser. CIKM '13. New York, NY, USA: Association for Computing Machinery, 2013, p. 2327-2332.

Ying et al., "A graphbased approach of automatic keyphrase extraction," Procedia Computer Science, vol. 107, pp. 248-255, 12 2017.

Zhang et al., "Keyphrase extraction using deep recurrent neural networks on Twitter," in Proceedings of the 2016 Conference on Empirical Methods in Natural Language Processing. Austin, Texas: Association for Computational Linguistics, Nov. 2016, pp. 836-845.

Zhang et al., "Keywords extraction based on word2vec and textrank," in Proceedings of the 2020 The 3rd International Conference on Big Data and Education, ser. ICBDE '20. New York, NY, USA: Association for Computing Machinery, 2020, p. 37-42.

Zhang et al., "Navigation configuration and placement influences the visual search efficiency and preference," in Proceedings of the 26th International Conference on World Wide Web Companion, ser. WWW '17 Companion. Republic and Canton of Geneva, CHE: International World Wide Web Conferences Steering Committee, 2017, p. 871-872.

* cited by examiner

FACETED NAVIGATION

RELATED APPLICATIONS

This application claims priority to U.S. Provisional Application No. 63/185,665, filed on May 7, 2021, entitled "FACETED NAVIGATION" and U.S. Provisional Application No. 63/193,582, filed on May 26, 2021, entitled "FACETED NAVIGATION," the entireties of which are hereby incorporated by reference.

FIELD

This disclosure relates generally to keyword extraction. More particularly, this disclosure relates to keyword extraction for faceted navigation on a website or application.

BACKGROUND

Faceted navigation can enable a website visitor such as a website of a retailer, to filter and/or sort search results based on one or more product attributes. Typically, keywords for the filtering and/or sorting may be mapped based on product attributes during product onboarding. However, the text describing the product (product description, highlights, bullets) often contains numerous keywords describing the product that are not mapped as an attribute.

SUMMARY

In some embodiments, a method includes extracting a set of candidate keywords from clickstream data and natural language processing of product text for a plurality of search queries. In some embodiments, the method further includes filtering the set of candidate keywords based on the clickstream data. In some embodiments, the method further includes ranking the set of candidate keywords as filtered based on the clickstream data. In some embodiments, the method further includes clustering the set of candidate keywords as ranked to remove near duplicates. In some embodiments, the method includes outputting the set of candidate keywords as ranked for a respective search query.

In some embodiments, the filtering further includes removing unigrams and product attributes.

In some embodiments, the method includes, in response to a user search, outputting the set of candidate keywords as ranked for display on a user interface.

In some embodiments, a non-transitory, computer-readable memory storing instructions that, when executed by a processor, cause the processor to perform a method that includes extracting a set of candidate keywords from clickstream data and natural language processing of product text for a plurality of search queries. In some embodiments, the method further includes filtering the set of candidate keywords based on the clickstream data. In some embodiments, the method further includes ranking the set of candidate keywords as filtered based on the clickstream data. In some embodiments, the method further includes clustering the set of candidate keywords as ranked to remove near duplicates. In some embodiments, the method includes outputting the set of candidate keywords as ranked for a respective search query.

In some embodiments, the method includes receiving a search query. In some embodiments, the method includes retrieving one or more keywords from a database based on the search query as received. In some embodiments, the one or more keywords are extracted from clickstream data and natural language processing of product text for a plurality of search queries; filtered based on the clickstream data; ranked based on the clickstream data; and clustered to remove near duplicates. In some embodiments, the method includes outputting the one or more keywords as retrieved to a user device for display via a user interface.

In some embodiments, a non-transitory, computer-readable memory storing instructions that, when executed by a processor, cause the processor to perform a method that includes receiving a search query. In some embodiments, the method includes retrieving one or more keywords from a database based on the search query as received. In some embodiments, the one or more keywords are extracted from clickstream data and natural language processing of product text for a plurality of search queries; filtered based on the clickstream data; ranked based on the clickstream data; and clustered to remove near duplicates. In some embodiments, the method includes outputting the one or more keywords as retrieved to a user device for display via a user interface.

In some embodiments, the techniques described herein relate to a method, including: extracting a first set of candidate keywords from a query log, wherein the first set of candidate keywords includes a keyword to product relevance and a query to product relevance; extracting a second set of candidate keywords from product text, wherein the extracting includes natural language processing of the product text to identify product defined keywords; filtering the first set of candidate keywords and the second set of candidate keywords based on clickstream data associated with the query logs to define a third set of candidate keywords; ranking the third set of candidate keywords as filtered based on the clickstream data to define a fourth set of candidate keywords; clustering the fourth set of candidate keywords as ranked, wherein the clustering removes near duplicates from the fourth set of candidate keywords; and storing the fourth set of candidate keywords as ranked for respective search queries in the query logs.

In some embodiments, the techniques described herein relate to a method, wherein filtering the first set of candidate keywords and the second set of candidate keywords further includes removing unigrams and product attributes.

In some embodiments, the techniques described herein relate to a method, wherein filtering the first set of candidate keywords and the second set of candidate keywords further includes removing keywords that are present in less than a threshold number of products.

In some embodiments, the techniques described herein relate to a method, wherein extracting the second set of candidate keywords includes natural language processing (NLP) including clustering nouns and adjectives into topics.

In some embodiments, the techniques described herein relate to a method, further including, in response to a user search, retrieving one or more keywords from the fourth set of candidate keywords based on the user search to define a fifth set of candidate keywords.

In some embodiments, the techniques described herein relate to a method, further including, outputting the fifth set of candidate keywords for display on a display of a user device.

In some embodiments, the techniques described herein relate to a method, wherein the fifth set of candidate keywords is limited to a threshold number of keywords.

In some embodiments, the techniques described herein relate to a method, wherein the fifth set of candidate keywords are displayed for faceted navigation and are selectable to modify search results visible on the display of the user device.

In some embodiments, the techniques described herein relate to a non-transitory, computer-readable memory storing instructions that, when executed by a processor, cause the processor to perform a method, including: extracting a first set of candidate keywords from a query log, wherein the first set of candidate keywords includes a keyword to product relevance and a query to product relevance; extracting a second set of candidate keywords from product text, wherein the extracting includes natural language processing of the product text to identify product defined keywords; filtering the first set of candidate keywords and the second set of candidate keywords based on clickstream data associated with the query logs to define a third set of candidate keywords; ranking the third set of candidate keywords as filtered based on the clickstream data to define a fourth set of candidate keywords; clustering the fourth set of candidate keywords as ranked, wherein the clustering removes near duplicates from the fourth set of candidate keywords; and storing the fourth set of candidate keywords as ranked for respective search queries in the query logs.

In some embodiments, the techniques described herein relate to a non-transitory, computer-readable memory, wherein filtering the first set of candidate keywords and the second set of candidate keywords further includes removing unigrams and product attributes.

In some embodiments, the techniques described herein relate to a non-transitory, computer-readable memory, wherein filtering the first set of candidate keywords and the second set of candidate keywords further includes removing keywords that are present in less than a threshold number of products.

In some embodiments, the techniques described herein relate to a non-transitory, computer-readable memory, wherein extracting the second set of candidate keywords includes natural language processing (NLP) including clustering nouns and adjectives into topics.

In some embodiments, the techniques described herein relate to a non-transitory, computer-readable memory, further including, in response to a user search, retrieving one or more keywords from the fourth set of candidate keywords based on the user search to define a fifth set of candidate keywords.

In some embodiments, the techniques described herein relate to a non-transitory, computer-readable memory, further including, outputting the fifth set of candidate keywords for display on a display of a user device.

In some embodiments, the techniques described herein relate to a non-transitory, computer-readable memory, wherein the fifth set of candidate keywords is limited to a threshold number of keywords.

In some embodiments, the techniques described herein relate to a non-transitory, computer-readable memory, wherein the fifth set of candidate keywords are displayed for faceted navigation and are selectable to modify search results visible on the display of the user device.

In some embodiments, the techniques described herein relate to a method, including: receiving a search query; retrieving one or more keywords from a database based on the search query as received, wherein the one or more keywords are: extracted from a query log and from product text, filtered based on clickstream data associated with query logs; ranked based on the clickstream data; clustered to remove near duplicates; and outputting the one or more keywords as retrieved to a user device for display via a user interface.

In some embodiments, the techniques described herein relate to a method, wherein outputting the one or more keywords includes limiting a number of the keywords below a threshold.

In some embodiments, the techniques described herein relate to a method, wherein the outputting causes display via the user interface in a faceted navigation menu.

In some embodiments, the techniques described herein relate to a method, including filtering one or more search results based on a selection in the faceted navigation menu of the one or more keywords as retrieved.

BRIEF DESCRIPTION OF THE DRAWINGS

References are made to the accompanying drawings that form a part of this disclosure and that illustrate embodiments in which the systems and methods described in this Specification can be practiced.

Like reference numbers represent the same or similar parts throughout.

DETAILED DESCRIPTION

Faceted navigation can enable a visitor to a website, such as a website of a retailer, to filter and/or sort search results by selecting one or more keywords. Often, the terms selected as the keywords for faceted navigation are based on one or more product attributes. These keywords (product attributes) may be selected to modify the search results that are visible to the website visitor. Typically, keywords for the faceted navigation may be selected based on product attributes. These product attributes can be identified during product onboarding. Sometimes, the product attributes are provided manually (e.g., by a product vendor). The product attributes may not completely reflect the information in the products and, as such, the faceted navigation may not be reflective of the website visitor's intent in completing a search that led to the search results. Typically, in addition to product attributes, a product can include text describing the product such as, but not limited to, a product description, product highlights, or other bullets about the product. The additional text for the product often contains numerous keywords describing the product that are not selected as an attribute.

Embodiments described herein can utilize the additional text about a product to expand the keywords available for faceted navigation. Additionally, some embodiments can leverage prior clickstream data that can be used to select keywords for display in the faceted navigation that are more relevant to the website visitor's search.

Advantageously, in some embodiments, the keywords generated and utilized for faceted navigation according to the embodiments described herein can reflect user intentions and past queries. Prior systems could not, as the keywords were selected based on product attributes defined outside of the user experience.

Figure 1:
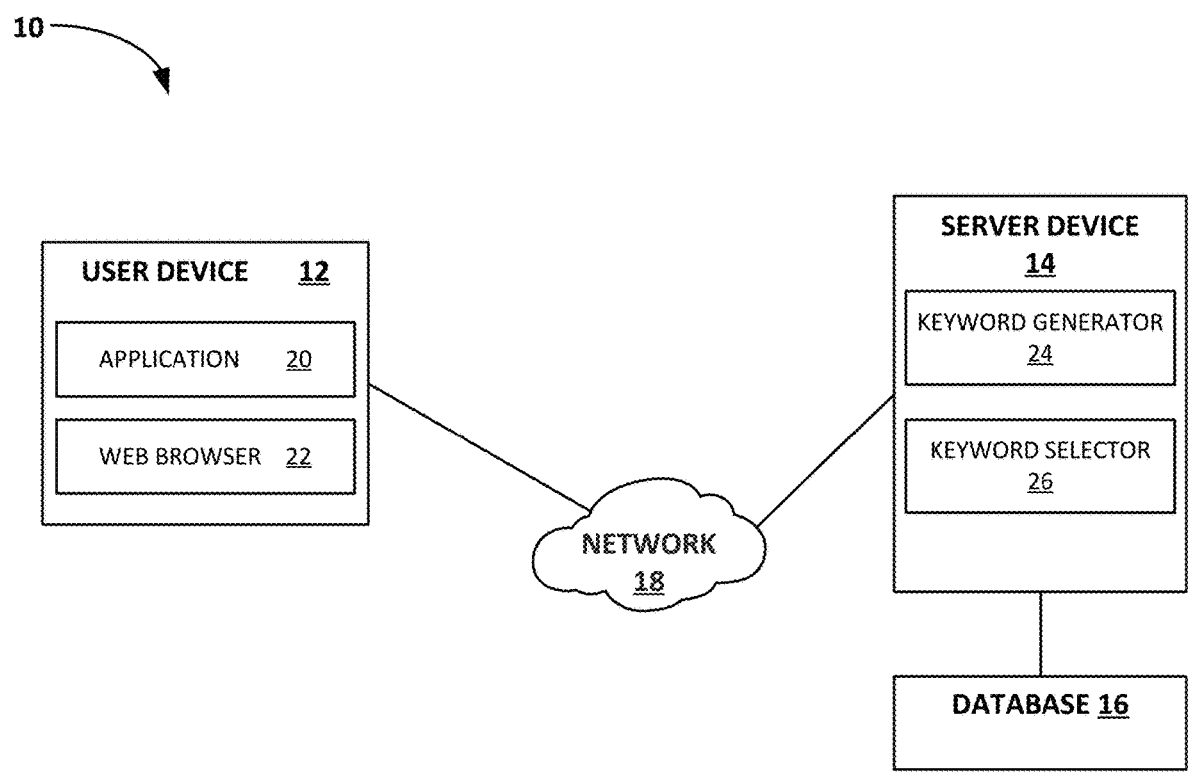
FIG. 1 is a diagrammatic view of an example faceted navigation system, according to some embodiments.

FIG. 1 is a diagrammatic view of an example faceted navigation system 10, according to some embodiments. The system 10 can generally be used to generate keywords for faceted navigation that are relevant to searches by website visitors. In some embodiments, the system 10 can include more keywords for the faceted navigation than prior systems which may have keywords limited to product attributes.

In the illustrated embodiment, the system 10 includes a user device 12, a server device 14, and a database 16 that are electronically communicable with one other via a network 18. It is to be appreciated that the illustration is an example and that the system 10 can vary in architecture. Generally, the system will include more than one user device 12 in communication with the server device 14 via the network 18.

In the illustrated embodiment, the user device 12 includes an application 20 and a web browser 22. In some embodiments, the application 20 or the web browser 22 can be used to submit a search query from the user device 12 to the server device 14. In some embodiments, the application 20 can be used to submit the search query instead of the server device 14. In some embodiments, the application 20 or the web browser 22 can be used by the user to select one or more keywords in user interface for filtering the search results (i.e., faceted navigation).

Examples of the user device 12 include, but are not limited to, a personal computer (PC), a laptop computer, a mobile device (e.g., a smartphone, a personal digital assistant (PDA), a tablet-style device, etc.), a wearable mobile device (e.g., a smart watch, a head wearable device, etc.), or the like. The user device 12 generally includes a display and an input. Examples of the display for the user device 12 include, but are not limited to, a monitor connected to a PC, a laptop screen, a mobile device screen, a tablet screen, a wearable mobile device screen, or the like. Examples of the inputs for the user device 12 include, but are not limited to, a keyboard, a mouse, a trackball, a button, a voice command, a proximity sensor, a touch sensor, an ocular sensing device for determining an input based on eye movements (e.g., scrolling based on an eye movement), suitable combinations thereof, or the like. The user device 12 can include aspects that are the same as, or similar to, FIG. 4 below.

The system 10 includes the server device 14 in electronic communication with the user device 12 via the network 18. The server device 14 can include a keyword generator 24. In some embodiments, the keyword generator 24 can be used to identify one or more keywords for application in faceted navigation. The server device 14 can also include a keyword selector 26 for selecting one or more of the keywords stored after generation by the keyword generator 24 in response to a search query by a user.

The server device 14 can include aspects that are the same as or similar to aspects of FIG. 4 below.

In some embodiments, the network 18 can be representative of the Internet. In some embodiments, the network 18 can include a local area network (LAN), a wide area network (WAN), a wireless network, a cellular data network, combinations thereof, or the like.

The server device 14 is in electronic communication with a database 16. The database 16 can include, among other features, a plurality of keywords (e.g., produced by the keyword generator 24 that can be used by the keyword selector 26 in response to a search query). In some embodiments, the server device 14 can include product information. The product information can be used, for example, to provide one or more product options to the user in response to determining the estimated measurements.

It is to be appreciated that various roles of the server device 14 and the database 16 can be distributed among the devices in the system 10. In some embodiments, the database 16 can be maintained on the server device 14.

Figure 2:
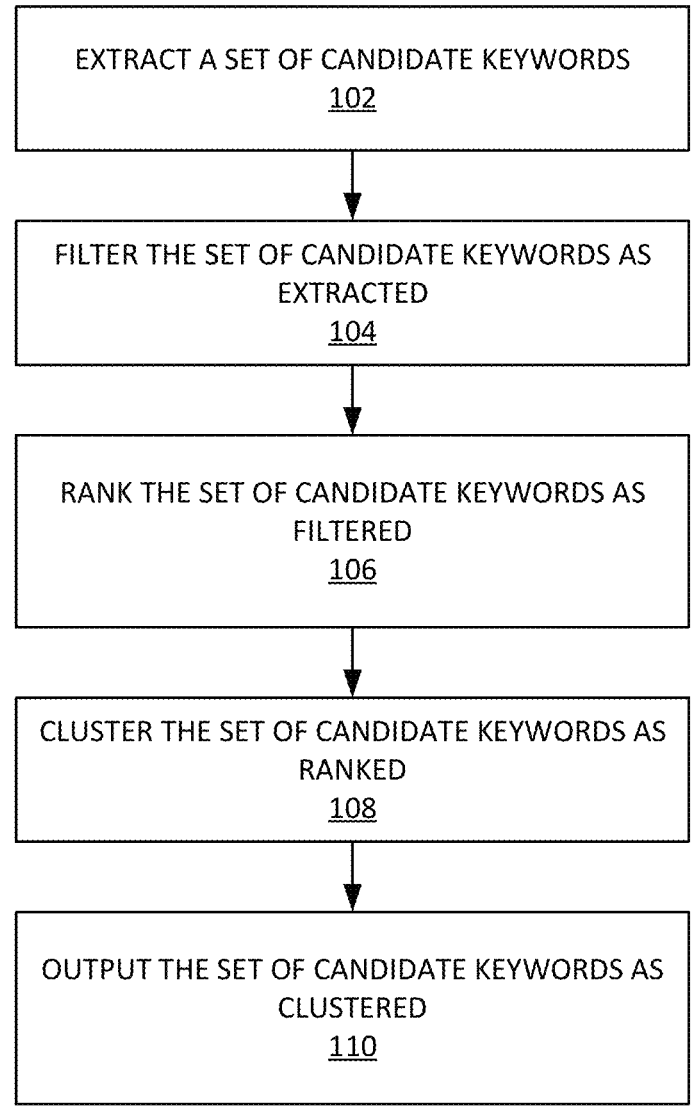
FIG. 2 is a flowchart of a method for generating keywords, according to some embodiments.

FIG. 2 is a flowchart of a method 100 for generating keywords, according to some embodiments.

At block 102, the method 100 includes extracting a set of candidate keywords. Extracting the set of candidate keywords can include, for example, extracting a set of candidate keywords based on query logs for a website. For example, the query logs can include past searches for a past period of time. In some embodiments, the past period of time can be the past one year. It is to be appreciated that this period can change. For example, the period of time can be based on an amount of data to ensure that the candidate keywords are relevant to past search queries. In some embodiments, the period can be less than one year or greater than one year. In some embodiments, the extracting can additionally, or alternatively, include extracting keywords from product text including a product description, product highlights, bullets about the product, or the like. In some embodiments, the candidate keywords can be extracted using natural language processing (NLP) techniques. In some embodiments, this can include leveraging parts of speech patterns to cluster nouns and adjectives into topics, graph-based techniques that include assigning significance scores to topics, statistical techniques, or the like.

At block 104, the method 100 includes filtering the set of candidate keywords as extracted at block 102. In some embodiments, the filtering includes using a context-free NLP pipeline in which keywords are filtered based on clickstream data from past user searches. In some embodiments, the filtering includes removing any keywords that match an attribute such as, but not limited to, a brand, a dimension, or the like. This can, for example, help with removing redundancy in the set of candidate keywords. In some embodiments, unigrams and keywords that are identified as being present in less than a threshold number of products are removed. In some embodiments, this can remove less relevant keywords. In some embodiments, the threshold can be selected to be two products. It is to be appreciated that this number is an example and that the actual threshold can vary beyond two.

At block 106, the method 100 includes ranking the set of candidate keywords as filtered at block 104. In some embodiments, the clickstream data can again be used in the ranking process. For example, a number of searches, a number of clicks, a number of orders the product has, or the like, can be used to rank the filtered keywords. Additionally, in some embodiments, non-product intent queries (such as, but not limited to, "buying guide" or the like) and to only consider relevant products, a ranking threshold based on the number of clicks and the number of orders for the product can be set. In some embodiments, the ranking process can thus include ranking the relevance of the product from which the keyword was extracted and the conversion metrics of the search term that had the keyword. By way of example, consider "S" be the search term for which the keywords are being ranked. Let "k1," "k2," and "k3" be the keywords extracted from products "p1," "p2," and "p3" respectively. Let "S1," "S2," and "S3" be the original search terms containing the keywords "k1," "k2," and "k3" that resulted in an interaction with products "p1," "p2," and "p3." Then the relevance of the products "p1," "p2," and "p3" is considered with "S" and also with "S1," "S2," and "S3."

At block 108, the method 100 includes clustering the set of candidate keywords as ranked at block 106. In some embodiments, the clustering can remove keywords that are near duplicates (e.g., "easy to install" and "easy installation"). This can, for example reduce noise in the keywords by grouping similar words. In some embodiments, the clustering can be performed using a combination of stemming, word2vec, and token similarity to group the keywords. In some embodiments, a pairwise similarity graph can be constructed, and a connected components algorithm executed to group the keywords. In some embodiments, the keyword with a lowest rank (from block 106) can be chosen as the cluster representative. In some embodiments, the clustering may be performed on a subset of the set of keywords that was ranked. For example, a top N number of ranked keywords can be clustered. In some embodiments, this can reduce a computational burden of the clustering.

At block 110, the set of candidate keywords following the clustering at block 108 is stored. In some embodiments, the set of candidate keywords can be stored, for example, in the database 16 (FIG. 1). When stored, the set of candidate keywords can include a ranked set of keywords per search query from the clickstream data. As a result, when similar queries are entered by a visitor of the website, the corresponding keywords for a search query can be used for presentation in the faceted navigation.

Figure 3:
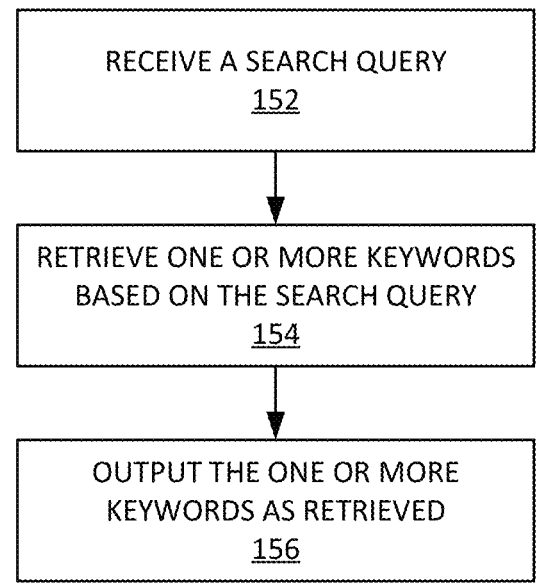
FIG. 3 is a flowchart of a method for selecting keywords in response to a search query, according to some embodiments.

FIG. 3 is a flowchart of a method 150 for selecting keywords in response to a search query, according to some embodiments.

At block 152, a search query can be received by a server device (e.g., the server device 14 of FIG. 1).

At block 154, a keyword selector (e.g., the keyword selector 26 of FIG. 1) can retrieve one or more keywords from a database (e.g., the database 16 of FIG. 1). In some embodiments, the keyword selector can retrieve the one or more keywords based on the search query as received at block 152. For example, the keyword selector can identify a search query that is similar (or the same as) to the received search query. The keyword selector can then retrieve all keywords associated with that search query in the database.

At block 156, the server device 14 can output the keywords as retrieved to a user device (e.g., the user device 12) for display via a user interface (e.g., through an application (e.g., application 20 of FIG. 1) or a web browser (e.g., web browser 22 of FIG. 1)). In some embodiments, the server device 14 can output a subset of the keywords as retrieved. For example, a top five keywords can be provided to the user device for display via the user interface. It is to be appreciated that the number of keywords returned can vary beyond the stated value (e.g., be less than five or be greater than five).

Figure 4:
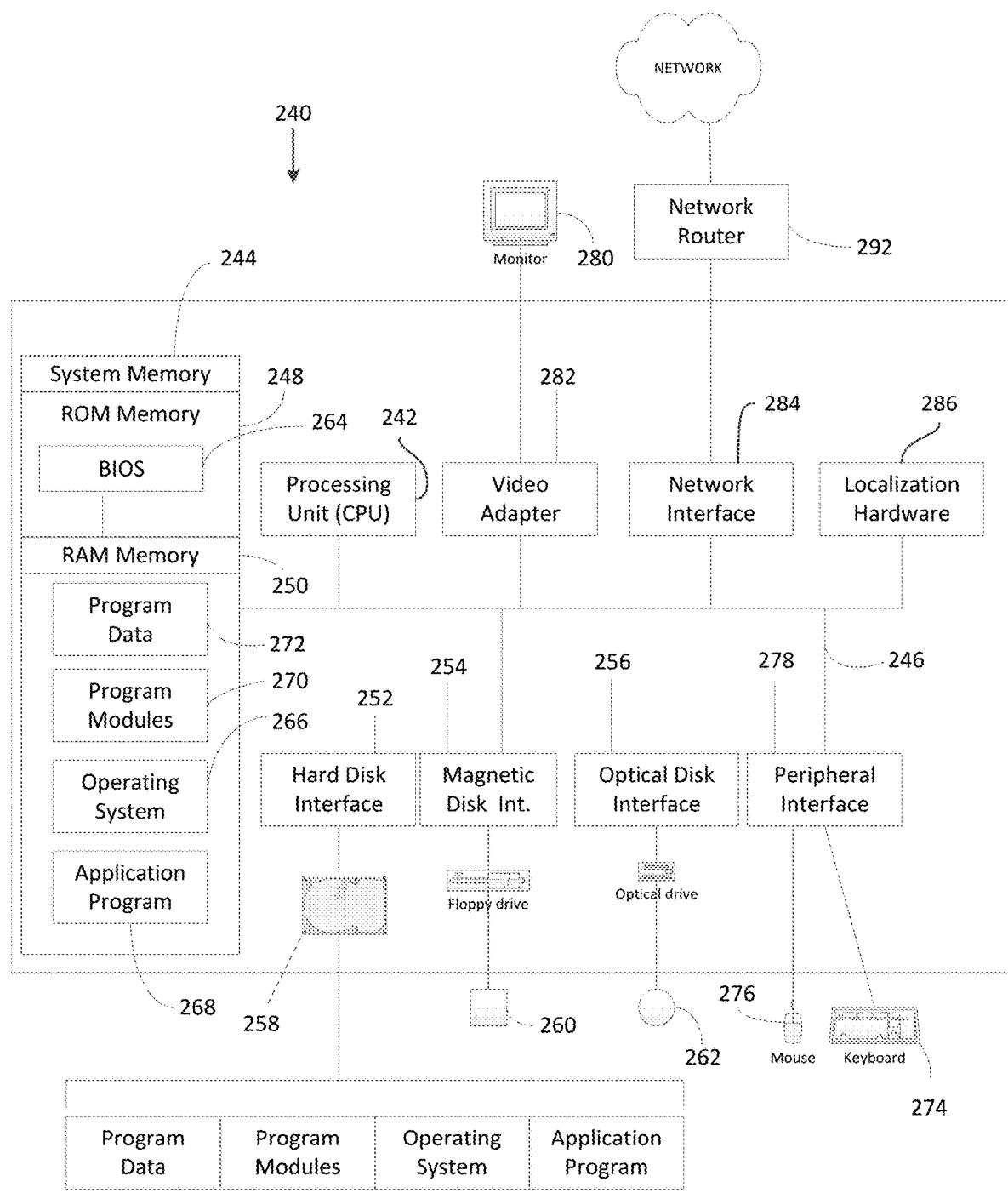
FIG. 4 is a diagrammatic view of an example user computing environment, according to some embodiments.

FIG. 4 is a diagrammatic view of an illustrative computing system that includes a general-purpose computing system environment 240, such as a desktop computer, laptop, smartphone, tablet, or any other such device having the ability to execute instructions, such as those stored within a non-transient, computer-readable medium. Furthermore, while described and illustrated in the context of a single computing system 240, those skilled in the art will also appreciate that the various tasks described hereinafter may be practiced in a distributed environment having multiple computing systems 240 linked via a local or wide-area network in which the executable instructions may be associated with and/or executed by one or more of multiple computing systems 240.

In its most basic configuration, computing system environment 240 typically includes at least one processing unit 242 and at least one memory 244, which may be linked via a bus 246. Depending on the exact configuration and type of computing system environment, memory 244 may be volatile (such as RAM 250), non-volatile (such as ROM 248, flash memory, etc.) or some combination of the two. Computing system environment 240 may have additional features and/or functionality. For example, computing system environment 240 may also include additional storage (removable and/or non-removable) including, but not limited to, magnetic or optical disks, tape drives and/or flash drives. Such additional memory devices may be made accessible to the computing system environment 240 by means of, for example, a hard disk drive interface 252, a magnetic disk drive interface 254, and/or an optical disk drive interface 256. As will be understood, these devices, which would be linked to the system bus 246, respectively, allow for reading from and writing to a hard disk 258, reading from or writing to a removable magnetic disk 260, and/or for reading from or writing to a removable optical disk 262, such as a CD/DVD ROM or other optical media. The drive interfaces and their associated computer-readable media allow for the nonvolatile storage of computer readable instructions, data structures, program modules and other data for the computing system environment 240. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nanodrives, memory sticks, other read/write and/or read-only memories and/or any other method or technology for storage of information such as computer readable instructions, data structures, program modules or other data. Any such computer storage media may be part of computing system environment 240.

Several program modules may be stored in one or more of the memory/media devices. For example, a basic input/output system (BIOS) 264, containing the basic routines that help to transfer information between elements within the computing system environment 240, such as during start-up, may be stored in ROM 248. Similarly, RAM 250, hard drive 258, and/or peripheral memory devices may be used to store computer executable instructions comprising an operating system 266, one or more applications programs 268 (such as the search engine or search result ranking system disclosed herein), other program modules 270, and/or program data 272. Still further, computer-executable instructions may be downloaded to the computing environment 260 as needed, for example, via a network connection.

An end-user may enter commands and information into the computing system environment 240 through input devices such as a keyboard 274 and/or a pointing device 276. While not illustrated, other input devices may include a microphone, a joystick, a game pad, a scanner, etc. These and other input devices would typically be connected to the processing unit 242 by means of a peripheral interface 278 which, in turn, would be coupled to bus 246. Input devices may be directly or indirectly connected to processor 242 via interfaces such as, for example, a parallel port, game port, firewire, or a universal serial bus (USB). To view information from the computing system environment 240, a monitor 280 or other type of display device may also be connected to bus 246 via an interface, such as via video adapter 282. In addition to the monitor 280, the computing system environment 240 may also include other peripheral output devices, not shown, such as speakers and printers.

The computing system environment 240 may also utilize logical connections to one or more computing system environments. Communications between the computing system environment 240 and the remote computing system environment may be exchanged via a further processing device, such a network router 292, that is responsible for network routing. Communications with the network router 292 may be performed via a network interface component 284. Thus, within such a networked environment, e.g., the Internet, World Wide Web, LAN, or other like type of wired or wireless network, it will be appreciated that program modules depicted relative to the computing system environment 240, or portions thereof, may be stored in the memory storage device(s) of the computing system environment 240.

The computing system environment 240 may also include localization hardware 286 for determining a location of the computing system environment 240. In embodiments, the localization hardware 286 may include, for example only, a GPS antenna, an RFID chip or reader, a Wi-Fi antenna, or other computing hardware that may be used to capture or transmit signals that may be used to determine the location of the computing system environment 240.

The computing environment 240, or portions thereof, may include one or more of the user device 12 and the server device 14 of FIG. 1, in embodiments.

The systems and methods described herein can advantageously ensure that B2B interactions include flexible and easy to manage security policies that are customizable by the businesses and the users accessing the computer systems of another business (e.g., a retail seller).

Examples of computer-readable storage media include, but are not limited to, any tangible medium capable of storing a computer program for use by a programmable processing device to perform functions described herein by operating on input data and generating an output. A computer program is a set of instructions that can be used, directly or indirectly, in a computer system to perform a certain function or determine a certain result. Examples of computer-readable storage media include, but are not limited to, a floppy disk; a hard disk; a random access memory (RAM); a read-only memory (ROM); a semiconductor memory device such as, but not limited to, an erasable programmable read-only memory (EPROM), an electrically erasable programmable read-only memory (EEPROM), Flash memory, or the like; a portable compact disk read-only memory (CD-ROM); an optical storage device; a magnetic storage device; other similar device; or suitable combinations of the foregoing.

In some embodiments, hardwired circuitry may be used in combination with software instructions. Thus, the description is not limited to any specific combination of hardware circuitry and software instructions, nor to any source for the instructions executed by the data processing system.

The terminology used herein is intended to describe embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

What is claimed is:

1. A method, comprising:
   extracting a first set of candidate keywords from a query log,
      wherein the first set of candidate keywords includes a keyword to product relevance and a query to product relevance;
   extracting a second set of candidate keywords from product text,
      wherein extracting the second set includes natural language processing of the product text to identify product defined keywords;
   filtering the first set of candidate keywords and the second set of candidate keywords based on clickstream data associated with the query logs to define a third set of candidate keywords;
   ranking the third set of candidate keywords as filtered based on the clickstream data to define a fourth set of candidate keywords;
   clustering the fourth set of candidate keywords as ranked, wherein the clustering removes near duplicates from the fourth set of candidate keywords; and
   storing the fourth set of candidate keywords as ranked for respective search queries in the query logs.

2. The method of claim 1, wherein filtering the first set of candidate keywords and the second set of candidate keywords further comprises removing unigrams and product attributes.

3. The method of claim 2, wherein filtering the first set of candidate keywords and the second set of candidate keywords further comprises removing keywords that are present in less than a threshold number of products.

4. The method of claim 1, wherein extracting the second set of candidate keywords includes natural language processing (NLP) including clustering nouns and adjectives into topics.

5. The method of claim 1, further comprising, in response to a user search, retrieving one or more keywords from the fourth set of candidate keywords based on the user search to define a fifth set of candidate keywords.

6. The method of claim 5, further comprising outputting the fifth set of candidate keywords for display on a display of a user device.

7. The method of claim 6, wherein the fifth set of candidate keywords is limited to a threshold number of keywords.

8. The method of claim 7, wherein the fifth set of candidate keywords is displayed for faceted navigation and are selectable to modify search results visible on the display of the user device.

9. A non-transitory, computer-readable memory storing instructions that, when executed by a processor, cause the processor to perform a method, comprising:
   extracting a first set of candidate keywords from a query log,
      wherein the first set of candidate keywords includes a keyword to product relevance and a query to product relevance;
   extracting a second set of candidate keywords from product text,
      wherein the extracting includes natural language processing of the product text to identify product defined keywords;
   filtering the first set of candidate keywords and the second set of candidate keywords based on clickstream data associated with the query logs to define a third set of candidate keywords;

ranking the third set of candidate keywords as filtered based on the clickstream data to define a fourth set of candidate keywords;

clustering the fourth set of candidate keywords as ranked, wherein the clustering removes near duplicates from the fourth set of candidate keywords; and storing the fourth set of candidate keywords as ranked for respective search queries in the query logs.

10. The non-transitory, computer-readable memory of claim 9, wherein filtering the first set of candidate keywords and the second set of candidate keywords further comprises removing unigrams and product attributes.

11. The non-transitory, computer-readable memory of claim 10, wherein filtering the first set of candidate keywords and the second set of candidate keywords further comprises removing keywords that are present in less than a threshold number of products.

12. The non-transitory, computer-readable memory of claim 9, wherein extracting the second set of candidate keywords includes natural language processing (NLP) including clustering nouns and adjectives into topics.

13. The non-transitory, computer-readable memory of claim 9, further comprising, in response to a user search, retrieving one or more keywords from the fourth set of candidate keywords based on the user search to define a fifth set of candidate keywords.

14. The non-transitory, computer-readable memory of claim 13, further comprising, outputting the fifth set of candidate keywords for display on a display of a user device.

15. The non-transitory, computer-readable memory of claim 14, wherein the fifth set of candidate keywords is limited to a threshold number of keywords.

16. The non-transitory, computer-readable memory of claim 15, wherein the fifth set of candidate keywords are displayed for faceted navigation and are selectable to modify search results visible on the display of the user device.

17. A method, comprising:
receiving a search query;
retrieving one or more keywords from a database based on the search query as received,
 wherein the one or more keywords are determined by:
  extracting a first set of candidate keywords from a query log,
   wherein the first set of candidate keywords includes a keyword to product relevance and a query to product relevance;
  extracting a second set of candidate keywords from product text,
   wherein extracting the second set includes natural language processing of the product text to identify product defined keywords;
  filtering the first set of candidate keywords and the second set of candidate keywords based on clickstream data associated with the query logs to define a third set of candidate keywords;
  ranking the third set of candidate keywords as filtered based on the clickstream data to define a fourth set of candidate keywords;
  clustering the fourth set of candidate keywords as ranked,
   wherein the clustering removes near duplicates from the fourth set of candidate keywords; and
 selecting the one or more keywords from the fourth set of candidate keywords;
outputting the one or more keywords as retrieved to a user device for display via a user interface.

18. The method of claim 17, wherein outputting the one or more keywords comprises limiting a number of the keywords below a threshold.

19. The method of claim 17, wherein the outputting causes display via the user interface in a faceted navigation menu.

20. The method of claim 19, comprising filtering one or more search results based on a selection in the faceted navigation menu of the one or more keywords as retrieved.

* * * * *